United States Patent
Carpenter et al.

(10) Patent No.: US 9,836,704 B2
(45) Date of Patent: Dec. 5, 2017

(54) POSTAL SEAMLESS ACCEPTANCE SYSTEM FOR DETERMINING EXCEPTION HANDLING

(75) Inventors: Michael D. Carpenter, Arlington, TX (US); Dale E. Redford, Grand Prairie, TX (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 1484 days.

(21) Appl. No.: 13/031,884

(22) Filed: Feb. 22, 2011

(65) Prior Publication Data
US 2011/0208626 A1 Aug. 25, 2011

(51) Int. Cl.
*G06Q 10/00* (2012.01)
*G06Q 30/04* (2012.01)
*G06Q 40/00* (2012.01)
*G07B 17/00* (2006.01)

(52) U.S. Cl.
CPC ............ *G06Q 10/00* (2013.01); *G06Q 30/04* (2013.01); *G06Q 40/12* (2013.12); *G07B 2017/00483* (2013.01)

(58) Field of Classification Search
CPC ........ G06Q 10/00; G06Q 40/12; G06Q 30/04; G07B 17/00024; G07B 17/00435; G07B 17/00508; G07B 2017/00443; G07B 2017/00709; G07B 2017/00596; G07B 2017/00475; G07B 2017/00483
USPC ..................................... 705/34, 41; 235/375
See application file for complete search history.

(56) References Cited

U.S. PATENT DOCUMENTS

| | | | | |
|---|---|---|---|---|
| 4,888,803 | A * | 12/1989 | Pastor | G07B 17/00467 380/51 |
| 6,762,384 | B1 * | 7/2004 | Kechel | B07C 3/00 209/584 |
| 6,823,237 | B1 * | 11/2004 | Bodie | 700/223 |
| 7,536,553 | B2 * | 5/2009 | Auslander | B41M 3/144 235/462.34 |
| 2003/0212644 | A1 * | 11/2003 | McLintock | G06Q 10/107 705/402 |
| 2005/0189409 | A1 * | 9/2005 | Conard et al. | 235/375 |
| 2006/0080266 | A1 * | 4/2006 | Kiani | B07C 1/00 705/402 |
| 2010/0049536 | A1 * | 2/2010 | Quine | G06Q 30/04 705/1.1 |
| 2010/0324724 | A1 * | 12/2010 | Elmenhurst | B07C 3/14 700/226 |
| 2011/0098846 | A1 * | 4/2011 | Yeung | B07C 3/12 700/224 |

* cited by examiner

*Primary Examiner* — Florian Zeender
*Assistant Examiner* — Milena Racic

(57) ABSTRACT

A mail processing system and method. A method includes receiving a mailing manifest that includes mailpiece identifiers. Each mailpiece identifier corresponds to an individual mailpiece in a group of mailpieces, and the mailing manifest includes a mailer identification that identifies the mailer of the group of mailpieces. The method includes processing the group of mailpieces and tracking the status of each of the mailpieces. The method includes updating the status of the mailpiece identifiers on the mailing manifest according to the tracking, and producing mail processing data. The method includes analyzing and storing the mail processing data.

19 Claims, 4 Drawing Sheets

POSTAL SEAMLESS ACCEPTANCE SYSTEM FOR DETERMINING EXCEPTION HANDLING

CROSS-REFERENCE TO OTHER APPLICATION

This application claims the benefit of the filing date of U.S. Provisional Patent Application 61/306,592, filed Feb. 22, 2010, which is hereby incorporated by reference.

TECHNICAL FIELD

The present disclosure is directed, in general, to processing of bulk mail and other mail pieces or parcels.

BACKGROUND OF THE DISCLOSURE

Improved systems for tracking and accounting for mail pieces is desirable.

SUMMARY OF THE DISCLOSURE

Various disclosed embodiments include a system and method. A method includes receiving a mailing manifest that includes mailpiece identifiers. Each mailpiece identifier corresponds to an individual mailpiece in a group of mailpieces, and the mailing manifest includes a mailer identification that identifies the mailer of the group of mailpieces. The method includes processing the group of mailpieces and tracking the status of each of the mailpieces. The method includes updating the status of the mailpiece identifiers on the mailing manifest according to the tracking, and producing mail processing data. The method includes analyzing and storing the mail processing data.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
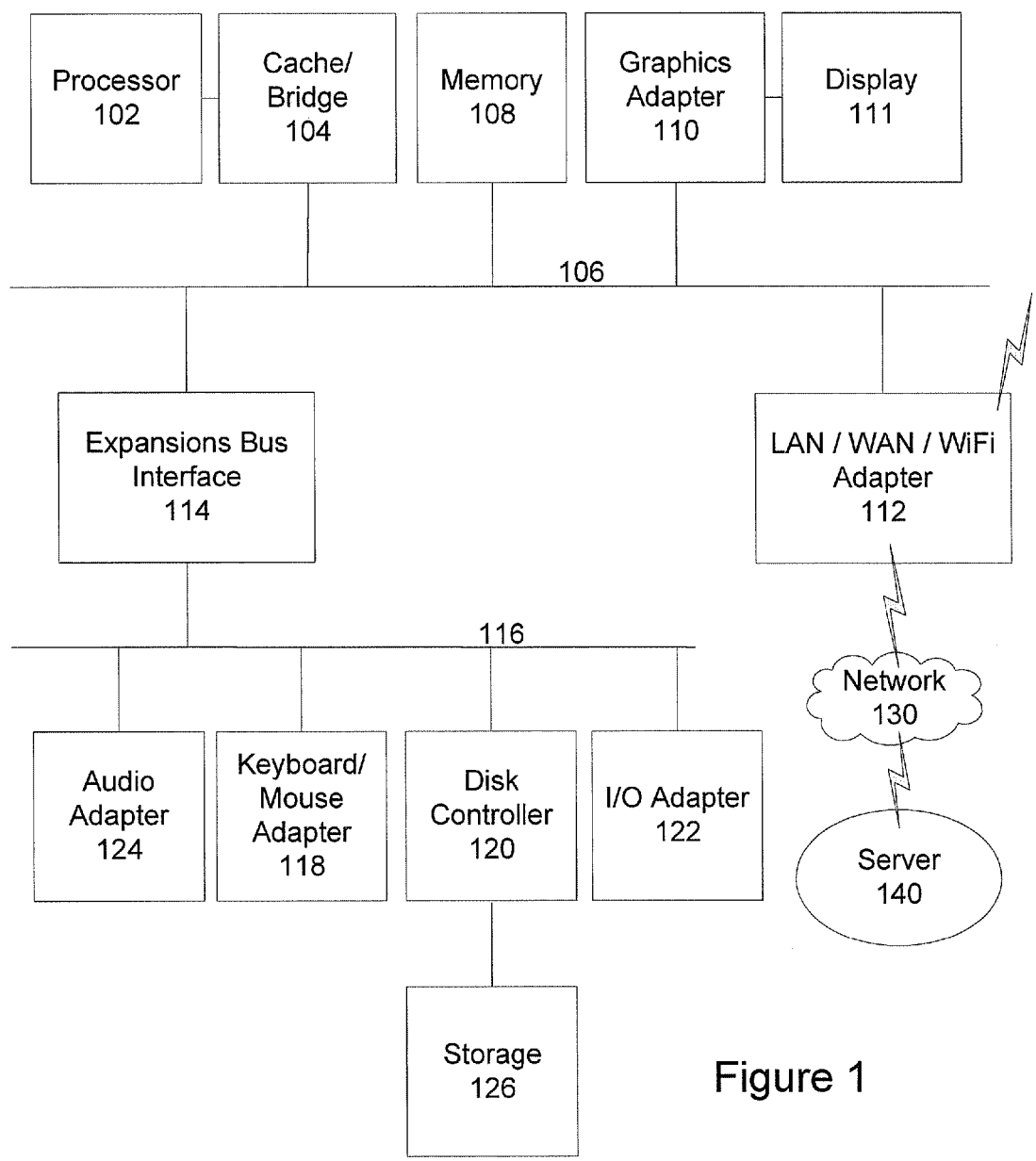
FIG. 1 depicts a block diagram of a data processing system in which an embodiment can be implemented.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Disclosed embodiments include a system and method for identifying mailpiece quality problems during online processing by a postal agency or presort bureau, whereby complete quality analysis for all mailings is achieved. Using such a system, the total exception handling cost for individual mailpieces which have been determined to exhibit preparation quality problems is accurately predicted, so that representative delivery costs for these processing exceptions may be charged back to the originator of the mailing. A similar system in the hands of the originator would allow them to identify specific mailpieces, rather than entire batches, that have quality problems which would lead to additional charges, thus allowing the originator to apply a remedy at a lower cost.

Postal Agencies have introduced "Work Sharing" programs whereby mass mailers introduce batches of mail deeply into the postal distribution network (toward the destination), whereby the processing costs of the postal agency can be greatly reduced, and a portion of this savings can be passed along to the originator in the form of discounts on the delivery fee. Since a significant portion of the postal agency's processing steps are bypassed through "Work Sharing," it is critical that the mailpieces introduced deeply into the system have been prepared to at least the same level and quality standards as the mailpieces which undergo the entire postal agency process. Otherwise, savings potential is lost in the exception processing of improperly prepared mailpieces, for which a discounted delivery fee was not completely justified.

To ensure that mail for which discounts are offered is prepared according to the prerequisite standards, technical solutions have been utilized whereby the quality of a batch of mail from the same originator is determined through statistical sampling using a machine designed specifically for that purpose. The machine is designed to check most of the preparation specifications associated with a particular discount rate, and according to the results as applied statistically to the batch, the batch is ultimately accepted or rejected. This process can either occur at the postal processing center, where remedies apart from either forgoing discounts for problematic batches or missing delivery timetables are impossible, or at the mailer's processing center, where entire batches are reprocessed as required to obtain the desired discount level.

The current system is undesirable in a number of ways to both postal agencies and mailers. For the postal agency, discounts are often offered to mail that is inadequately preprocessed, thus requiring expensive exception processing. In the United States Postal Service, this is widely regarded as the largest class of fraud, far outstripping other categories such as counterfeit stamps. In addition, the quality checking process is by necessity a serial event, requiring significant staffing, and delaying entry of this mail into the system. This aspect of the current system is also regarded as onerous by the mailers, who have other significant problems with the system. For example, quality standards published by the postal agencies appear to be arbitrarily high, significantly exceeding both the standards the postal agency applies for its own processing quality, and the level of quality actually required to process mail at optimal productivity, thus justifying a discount.

Disclosed embodiments mitigate the shortcomings of the current system for both the mailer and the postal agency by measuring the costs associated with delivery on the individual mailpiece basis, allowing the basis by which only additional fees caused by the actual processing of exception mailpieces are levied back to the originator. The mailer is not faced with reprocessing entire batches of mail or forgoing discounts for entire batches, and the postal agency can drive postage fraud out of the system by checking nearly all of the mail for which postage discounts have been applied.

A system in accordance with disclosed embodiments uses multiple data processing systems to track and account for individual mailpieces as they are processed, and to determine whether a specific mailing should be billed for additional costs. In the case of a bulk mailing, every piece may be analyzed for specific costs, or a sampling of mailpieces can be analyzed to attribute costs to the bulk mailing. The data processing systems described herein can interact with or be integrated into conventional postal processing equipment, and configured to perform the processes described herein.

FIG. 1 depicts a block diagram of a data processing system in which an embodiment can be implemented, for example as one of the systems or servers described below, and can be configured to perform processes as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. I/O adapter 122 can also be connected, in some embodiments, to a barcode scanner for scanning barcode labels on test packages or test box controllers, and can be connected to communicate directly with a test box controller as described herein.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure can include an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. LAN/WAN/Wireless adapter 112 can also communicate with test box controllers as described herein, and perform other data processing system or server processes described herein. Data processing system 100 can communicate over network 130 with one or more server systems 140, which are also not part of data processing system 100, but can be implemented, for example, as separate data processing systems 100.

A "mail processing system", as used herein, can include one or more data processing systems, acting individually or collectively, and can include or be connected to appropriate hardware to perform other mail processing functions, such as sorting, scanning, printing, etc., including scanning devices, such as a scanner, camera, OCR system, POSTNET bar code reader, or POSTNET bar code verifier. Such additional hardware is known to those of skill in the art, and so any combination of the data processing system hardware and mail processing hardware as described herein, configured to perform processes as described herein, is intended to be within the scope of this disclosure.

According to disclosed embodiments, individual mailpieces can be identified, either by imprinted indicia such as barcodes or by automatically identifying image characteristics of individual mailpieces. Mailpieces can be associated with unique serial numbers, such as identification barcodes, or by their graphical features, without the presence of an identification barcode. Using this information, individual mailpieces can be tracked and scrutinized as they are processed, by associating each mailpiece with a unique identifier (referred to as a mailpiece identifier (ID) herein), such as a serial number or other identifier, ID tag, number, label, and other information. One technique for identifying and tracking mailpieces is described in copending, commonly-assigned U.S. patent application Ser. No. 11/440,941, filed May 25, 2006, which is hereby incorporated by reference.

In some embodiments, the mailpieces are associated with unique identifiers when pre-processed, such as when the mailing is assembled by the mailer, and this can be before they are delivered to the United States Postal Service (USPS) or other postal agency. This association can include creating a mailpiece identification record for each mailpiece, and this record can include data such as the mailpiece ID, mailer, destination address or other information, and status information to be updated as the mailpiece is processed. In some embodiments, a mailing manifest can be created. A mailing manifest is particularly useful for bulk mailings, and can include information common to all of the mailpieces in the bulk mailing, such as mailer information, postage billing information, discounts applied, physical characteristics, and other information, and can also include a list of all mailpiece IDs for the mailpieces in the associated bulk mailing.

In some embodiments, the mailer provides such a mailing manifest for each bulk mailing, describing the each of the mailpieces in that bulk mailing. This mailing manifest can be provided to the postal agency in advance of the physical mailpieces, and describes the individual items that are being prepared, representing what will be delivered to the postal agency for processing and ultimate delivery. Individual items are uniquely identified, and can be correlated to the manifest. In the remaining processing steps by the postal agency, the individual items are scanned and their mailpiece IDs are recorded. Since the original manifest represents the mailpiece IDs assigned and the total postage paid, the processing systems should not encounter extra items that do not appear the manifest. Extra items, existing physically among the mailpieces but not on the manifest, can indicate postage fraud.

Missing items are also detected where no physical mailpiece is present that corresponds to a mailpiece ID on the mailing manifest. These missing items can represent processing anomalies, otherwise known as "exceptions," which carry a higher cost to process.

In various embodiments, the systems also track individual mailpieces on their way through the processing and distribution system, with date/time stamps that show when individual items were processed at given points in the system.

In general, postage discounts are offered to a mailer predicated on an optimal set of processing steps through the common distribution and delivery system. Deviation from this optimal set of processing steps diminishes the expected savings (which have already been given to the mailer). Failure to execute the optimal set of processing steps has heretofore been the focus of statistical methods of quality checking. In this approach, measurable attributes that tend to cause sub-optimal processing and diminished savings are checked using statistical sampling methods.

According to various disclosed embodiments, deviations from the optimal set of processing steps can be predicted by analyzing the quality of the delivery information printed on the mailpiece, and measured through conventional tracking, augmented as required through the use of "fingerprint" identification based on associating the mailpiece ID with automatically identified image characteristics of individual mailpieces, described in more detail below. In addition, explicit costs according to the type and degree of deviation, which represent initial overvalue of the discount offered to the mailer, can be calculated and charged back to the mailer. Physical mailpieces that were not recorded on the manifest can also be charged back to the mailer.

Abbreviated optimal processing is the basis for discounts which are offered, and is contingent on avoiding "exception" processing. The reasons that individual pieces of mail within a batch end up as exceptions include physical properties that do not meet specification, such as stiffness, weight or size; the completeness and accuracy of delivery information on the individual mailpiece; the validity of the indicia; the readability of that delivery information; and/or other requirements stated in the USPS Domestic Mail Manual (DMM).

The individual mailpieces or groups of mailpieces within a mailing can be analyzed against the electronic manifest to evaluate the correctness and accuracy of the traying and presort quality of the physical mailpieces received by the postal agency. Various embodiments can include testing all aspects of these characteristics or the highest value subset. The optimal value for a subset can be determined according to the number of sensors required to measure the range of characteristics, and their cost, as compared to the estimated value lost to exceptions in the given category.

The collection of data can occur at several points within the postal system. Electronic submissions, pallet scans, tray scans, and real-time information from the mail processing equipment are but a few examples of where data is collected. This data can be used to drive isolated solutions to issues and can provide extremely detailing information of postal processes when it is aggregated, indexed, and trended over time. This analysis can be performed on a local and a national level with a hub-and-spoke connections to the individual sites that are actively collecting data.

In some embodiments, these processes can be used as part of a Mail and Customer Analysis (MCAS) system that accurately provides the postal system with a "report card" on a customer by customer basis along with evidentiary data required to support its analysis. Such a report card can evaluate the overall quality of a customer's mailings with respect to postal requirements, whether the customer's mailings provide atypical results when compared to similarly-processed mail, whether any discounts provided to that customer are appropriate or need adjustment, and other information.

Figure 2:
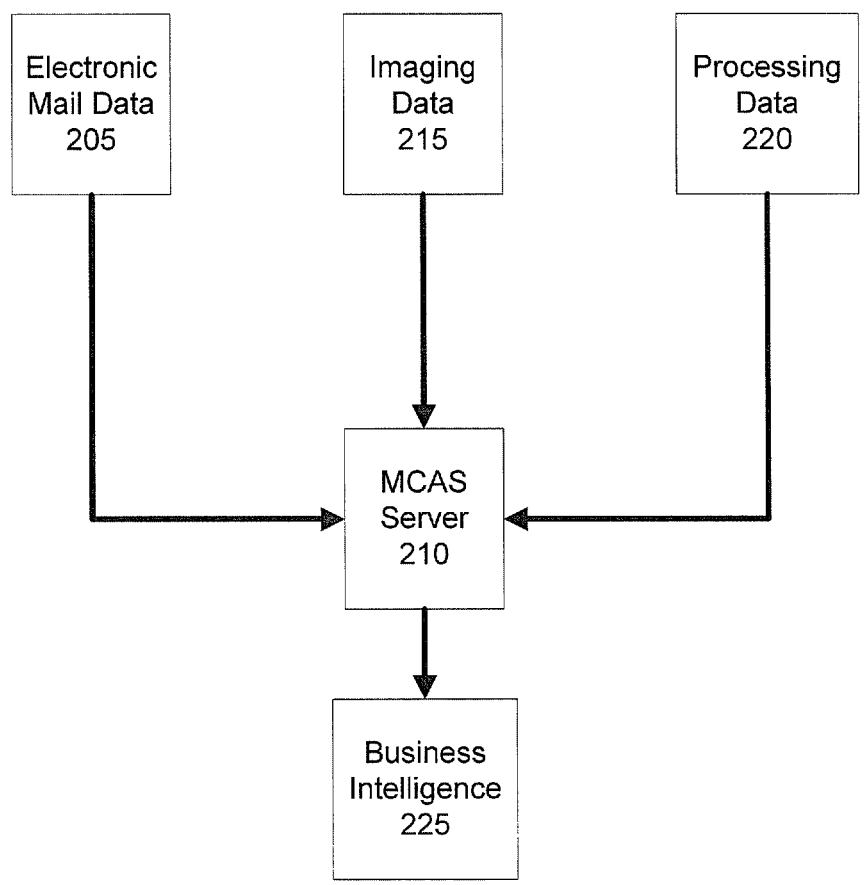
FIG. 2 depicts a block diagram of a system for assembling historical mail processing data in accordance with disclosed embodiments.

FIG. 2 depicts a block diagram of a system for assembling historical mail processing data in accordance with disclosed embodiments.

In this figure, electronic mail data 205 is produced by mailers, postal processors, pre-processors, or other customers or entities. This mail data can include, for example the mailpiece IDs, the mailing manifest, postage and payment information, discount information, origin and destination information, and other information related to bulk or individual mail.

The electronic mail data 205 is sent to an MCAS server 210. The MCAS server also receives imaging data 215 for the mail pieces. This imaging data can include any data derived from processing, imaging, and scanning the mailpieces, including origin and destination information, physical characteristics, mailpiece IDs, and other such information related to the bulk or individual mail. The imaging data can be produced by the pre-processor, the postal agency, individual mail kiosks or retail stores, or otherwise. The MCAS server can be considered to be a "mail processing system" as described herein.

When processing the mailpieces, the postal agency or processor produces processing data 220, including information related to the physical characteristics of the mailpieces, the quality of the mailings in terms of correct addressing, labeling, physical characteristics, and other aspects, the mailpiece IDs, the number of exceptions produced by the processing, and other information related to the processing of the bulk or individual mail pieces. The processing data is also received by MCAS server 210.

From the various data and information received, the MCAS server produces business intelligence 225 for use by the USPS or other agencies. The business intelligence 225 includes data derived from combining the electronic mail data 205, imaging data 215, and processing data 220. The business intelligence can include information related to a specific customer's mailing habits and the quality of the mailings, and can be used to adjust postage rates, discounts, or business practices with relation to that customer.

Since some processing exceptions are associated with inability to "read" features designed into the mailpiece that are intended for use in individual re-identification, e.g., tracking numbers and related barcodes, it is advantageous in some embodiments to use alternative technology for this purpose. Disclosed embodiments use a "fingerprint" approach through which it is possible to not only classify mail by batches, but to explicitly re-identify individual pieces of mail using characteristics derived from images of individual mailpieces. In various embodiments, such automatic mailpiece identification and classification can be implemented using techniques discussed, for example, in U.S. Pat. Nos. 6,888,084 and 6,762,384, incorporated herein by reference.

Various embodiments use the mailpiece fingerprint to classify mail by batch, so that relevant readable information from mail in a batch can be attributed to items in the batch for which the same information is not readable. Various embodiments also allow individual items to be re-identified, such that exception-causing attributes can be stored and referred to individual items that are not otherwise readable or uniquely identifiable. All items are therefore identifiable by batch and distinguishable from other items. For example, if a batch has been identified as associated with a particular bulk rate postage permit, then other mailpieces of that batch can be automatically identified by fingerprint using the image-recognition techniques described herein, and even if a particular mailpiece has an unreadable indicia for postage, the system can automatically classify it with the batch and appropriate bulk rate postage permit.

Individual items, once "fingerprinted," can be logged according to the range of tested characteristics, and tracked through the optimal processing. Items which are either discharged from optimal processing, or are identified with characteristics which directly affect postage (e.g., destination or physical characteristics) can have specific incremental charges applied to them. These charges can be levied to the mailer that submitted the batch.

Figure 3:
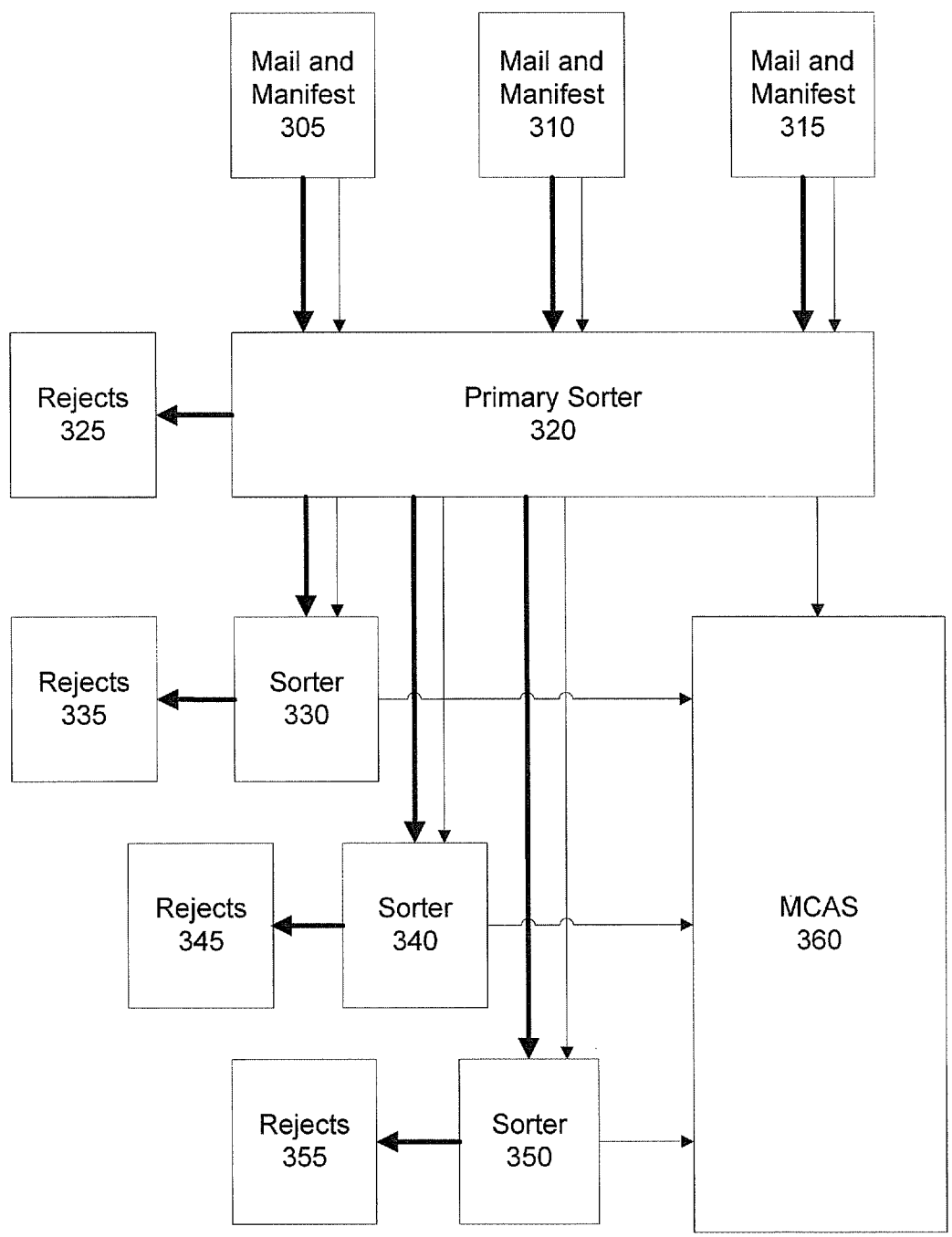
FIG. 3 depicts an example implementation in accordance with disclosed embodiments.

FIG. 3 depicts an example implementation in accordance with disclosed embodiments. In this example, three mailers 305, 310, and 315 submit mail and mailing manifests. Assume, in this example, that the mail from each of these mailers has been presorted to the first 3 digits of the ZIP code to a USPS processing and distribution center (P&DC).

The mail and mailing manifests are sent to an incoming primary sorter 320 where the mail is sorted to the 5 digit ZIP code. The 5 digit code typically identifies a local post office where the letter carriers receive mail for their route. A typical P&DC will serve approximately 8040 zones. During this sort process, some of the mail will not be able to be processed automatically, and will be designated as rejects 325. The primary sorter sends the sort data (and any other processing data), including the mailpiece IDs of any rejects, to MCAS 360.

Mail destined for each particular zone is sent to and processed on a delivery bar code sorter (DBCS) 330, 340, 350 to put the mail in walk sequence for the carriers in that zone. The mailing manifests for each group of mailpieces are also sent to the respective sorters. In this figure, thick lines represent movement of mailpieces, and thin lines represent movement of data related to the mailpieces.

Each of the individual sorters 330, 340, 350 sorts its respective group of mailpieces, and the successfully sorted mail is given to the carrier for delivery and no further sorting is required. During each of these separate sort processes, some of the mail will not be able to be processed automatically, and will be designated as respective rejects 335, 345, 355. The sorters 330, 340, 350 also send the sort data (and any other processing data), including the mailpiece IDs of any rejects, to MCAS 360 or another data processing system configured to perform the processes described herein.

As shown in FIG. 3, some mail will not process successfully and will be rejected as rejects 325, 335, 345, 355. This is typically a small percentage (<2%), but the cost of further sorting is very expensive compared to sorting done by automation. Manual sort rates can be as low as 500 pieces sorted per labor hour compared to over 15,000 per labor hour for automation. Mail that is rejected during the incoming primary sort as rejects 320 must be sorted manually to the zone. This mail is given to the local post office where it is manually sorted to the carrier and then the carrier manually sorts it to walk sequence for the route, as are any of the other rejects 335, 345, 355.

The MCAS can identify the mailer for pieces that are rejected, based on the mailing manifests and/or any fingerprint identification. Because the mailer was given a discount rate that assumed the mail would successfully be processed on automation, the post office is justified in charging the mailer for the manual processing that is incurred. MCAS 360 can then produce a mailer invoice that can be used to charge the mailer precisely for the service received based on the quality of the mailing.

Further, MCAS 360 can accumulate the historical data for each mailer, and produce and store records of each mailer's general quality and conformance to mailing requirements. Each of the systems and sorters depicted in FIG. 3 can be considered "mail processing systems" as described herein.

Additionally, such a system can provide the USPS with improved operating visibility. As a typical P&DC has multiple zones and multiple DBCSs servicing those zones, anomalies occur from operation to the next. In cases where the mailpieces are identical in makeup, yet the performance of one operation is significantly below that of the others, operational problems can be identified. Similarly, when a mailing is prepared to a specific presort level, it is anticipated that the mailing will go through specific sequence of operations. When those operational sequences are not adhered to, these can now be identified. By processing the sort data, mailing manifests, and/or fingerprint data, the MCAS can identify specific operational problems with specific sorters, locations, or other equipment or processes.

For example, if the mail from mailer 305 is processed with few rejects or other problems on sorters 320, 330, and 340, but has a significant number of rejects or other problems at sorter 350, the MCAS can identify from the sort data that there may actually be an operational issue with sorter 350, rather than with the quality of the mailpieces from mailer 305.

Such a system can also be used accurately identify operational flow. Based on the level of preparation detected from the sort data, an optimal routing of the mailing can be prepared and deviation from that optimal routing can be determined.

Figure 4:
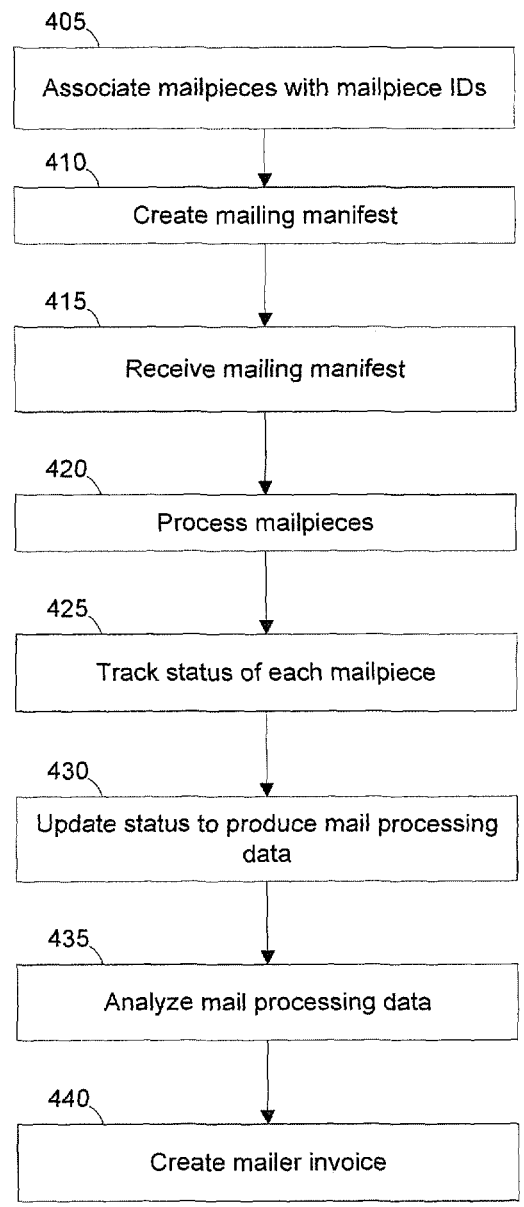
FIG. 4 depicts a flowchart of a process in accordance with disclosed embodiments.

FIG. 4 depicts a flowchart of a process in accordance with disclosed embodiments. Each of the steps described below is performed by one or more mail processing systems, though referred to in the singular below; these systems can be independent or can be acting together to perform the described acts. In some cases, various mail processing systems are co-located at a single mail processing facility; in other cases, various mail processing systems can be separately located at different facilities. The mailpieces themselves may be transported between mail processing systems during or between each of the steps described herein, in a conventional fashion.

The mail processing system associates individual mailpieces with respective mailpiece IDs by (step 405). This step can include printing barcodes or other indicia on the mailpieces to identify them, and can include performing a fingerprint mail identification process to uniquely identify each mailpiece according to its physical characteristics. This step can include creating a mailpiece identification record for each mailpiece, as described herein. This step can be performed by a mail processor when it receives mailpieces, by the mailer as it is preparing the mailpieces, or otherwise.

The mail processing system creates a mailing manifest that includes the mailpiece IDs of individual mailpieces in a group of mailpieces (step 410). In some cases, the group of mailpieces can be a batch of bulk mail. The mailing manifest can include other data associated with its mailpiece IDs, and includes in particular an mailer identification that identifies the mailer of the mailpieces.

The mail processing system receives the mailing manifest (step 415). This step can also include receiving mailpiece identification records for each of the mailpieces. Receiving, in this case, can include loading from storage or receiving from another process on the same mail processing system, but more typically includes receiving in one mail processing system from another mail processing system.

The mail processing system processes the mailpieces (step 420). This step can include singulating, sorting, transporting, bundling, labeling, imaging, or performing other common mail processing functions on the mailpieces.

During this processing, the mail processing system tracks the status of each mailpiece according to its mailpiece ID (step 425). This step can also include identifying any mailpieces in the group that do not have an associated mailpiece ID on the mailing manifest, and can include identifying any mailpiece IDs that are on the mailing manifest but do not get processed.

The system updates the status of each mailpiece ID on the mailpiece manifest according to the tracking (step 430). This step can also include updating the status of each mailpiece on its mailpiece identification record. These updates, and any other data collected during the processing, are used to produce mail processing data corresponding to the mailpieces.

The mail processing system analyzes and stores the mail processing data (step 435). This step can include producing a mail quality report corresponding to the mailer and the mail processing data.

Based on the analysis, the mail processing system creates a mailer invoice (step 440). The mailer invoice can include additional charges required by the mail processing data, for example any data that indicates that individual mailpieces had to be manually processed, that individual mailpieces have physical characteristics that require higher charges, or other data. The mailer invoice is associated with the identifier of the mailer of the mailpieces, as determined from the mailing manifest or the mailpiece identification records. The mailer invoice may include mailpiece IDs or other data from the mailing manifest or the mailpiece identification records to aid the mailer in determining the problem with the mailings.

The mailer invoice can then be sent to the mailer, or automatically processed to charge the mailer for the appropriate additional charges.

In various embodiments, various ones of the steps above may be performed sequentially, concurrently, in a different order, or omitted, unless otherwise specifically claimed. In particular, various steps can be performed at different locations or by different parties using separate or interconnected mail processing systems, and so only specific steps may be performed at a certain time or by a specific party or system.

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method, performed by at least one mail processing system, the method comprising:
   receiving a mailing manifest that includes mailpiece identifiers, by the at least one mail processing system, each mailpiece identifier corresponding to an individual physical mailpiece in a group of mailpieces, the mailing manifest including a mailer identification that identifies the mailer of the group of mailpieces;
   physically processing the group of mailpieces by the at least one mail processing system, including imaging each of the mailpieces by at least one scanning device and sorting each of the mailpieces by at least one sorter;
   tracking a status of each of the mailpieces by the at least one mail processing system while processing each physical mailpiece;
   updating a status of the mailpiece identifiers on the mailing manifest according to the tracking, by the at least one mail processing system, and producing mail processing data; and
   analyzing and storing the mail processing data by the at least one mail processing system.

2. The method of claim 1, wherein analyzing the mail processing data includes producing a mail quality report corresponding to the mailer and the mail processing data and includes determining processing cost data for a plurality of the mailpieces.

3. The method of claim 1, further comprising creating a mailer invoice based on the analysis that includes additional charges required by the mail processing data.

4. The method of claim 1, further comprising associating each of the individual mailpieces with a respective one of the mailpiece identifiers.

5. The method of claim 1, further comprising creating a mailpiece identification record for each mailpiece.

6. The method of claim 1, wherein the group of mailpieces is a batch of bulk mail.

7. The method of claim 1, further comprising receiving the mailing manifest from a first mail processing system in a second mail processing system.

8. The method of claim 1, wherein tracking the status of each of the mailpieces includes identifying any mailpieces that do not have an associated mailpiece identifier on the mailing manifest.

9. The method of claim 1, wherein tracking the status of each of the mailpieces includes identifying any mailpiece identifiers that are on the mailing manifest but are not processed.

10. The method of claim 1, further comprising updating the status of each mailpiece identification record according to the tracking for the respective mailpiece.

11. A mail processing system, comprising:
    at least one processor connected to interact with mail processing hardware; and
    a memory, wherein the mail processing system is configured to
    receive a mailing manifest that includes mailpiece identifiers, each mailpiece identifier corresponding to an individual physical mailpiece in a group of mailpieces, the mailing manifest including a mailer identification that identifies the mailer of the group of mailpieces;
    physically process the group of mailpieces, including imaging each of the mailpieces by at least one scanning device and sorting each of the mailpieces by at least one sorter;
    track a status of each of the mailpieces while processing each physical mailpiece;
    update a status of the mailpiece identifiers on the mailing manifest according to the tracking, and produce mail processing data; and
    analyze and store the mail processing data.

12. The mail processing system of claim 11, wherein analyzing the mail processing data includes producing a mail quality report corresponding to the mailer and the mail processing data and includes determining processing cost data for a plurality of the mailpieces.

13. The mail processing system of claim 11, wherein the mail processing system also creates a mailer invoice based on the analysis that includes additional charges required by the mail processing data.

14. The mail processing system of claim 11, wherein the mail processing system also associates each of the individual mailpieces with a respective one of the mailpiece identifiers.

15. The mail processing system of claim 11, wherein the mail processing system also creates a mailpiece identification record for each mailpiece.

16. The mail processing system of claim 11, wherein the group of mailpieces is a batch of bulk mail.

17. The mail processing system of claim 11, wherein tracking the status of each of the mailpieces includes identifying any mailpieces that do not have an associated mailpiece identifier on the mailing manifest.

18. The mail processing system of claim 11, wherein tracking the status of each of the mailpieces includes identifying any mailpiece identifiers that are on the mailing manifest but are not processed.

19. The mail processing system of claim 11, wherein the mail processing system also updates the status of each mailpiece identification record according to the tracking for the respective mailpiece.

* * * * *